United States Patent [19]
Boyer

[11] Patent Number: 4,874,184
[45] Date of Patent: Oct. 17, 1989

[54] TRAILER

[75] Inventor: John D. Boyer, Riverside, Calif.

[73] Assignee: Road Systems, Inc., Fontana, Calif.

[21] Appl. No.: 175,689

[22] Filed: Mar. 21, 1988

Related U.S. Application Data

[63] Continuation of Ser. No. 798,843, Nov. 18, 1985, abandoned.

[51] Int. Cl.$^4$ ................. B62D 53/06; B62D 63/06
[52] U.S. Cl. ..................... 280/423.1; 280/789;
296/181; D12/97; D12/102; D12/181
[58] Field of Search ........... 280/423 R, 423 B, 425 A,
280/400, 2, 789, 790, 5 C; 296/181, 183, 15;
D12/97, 102, 181

[56] References Cited

U.S. PATENT DOCUMENTS

| | | | |
|---|---|---|---|
| D. 146,879 | 6/1947 | Sebern | D12/97 |
| D. 176,122 | 11/1955 | Hockensmith | D12/97 |
| 2,844,265 | 7/1958 | Clark | 280/423 B |
| 2,872,240 | 2/1959 | Bennett | 296/181 |
| 3,003,787 | 10/1961 | Woolslayer | 280/423 R |
| 3,081,104 | 3/1963 | Schmiermann | 280/5 C |
| 3,216,758 | 11/1965 | Bohlen | 296/181 |
| 3,425,740 | 2/1969 | Vaughn | 296/15 |
| 3,771,829 | 11/1973 | Breazeale | 280/789 |
| 4,065,168 | 12/1977 | Gregg | 296/183 |
| 4,344,636 | 8/1982 | Van Der Lely | 280/5 C |
| 4,531,781 | 7/1985 | Hunt | 280/790 |
| 4,595,231 | 6/1986 | Bennett | 296/181 |

FOREIGN PATENT DOCUMENTS

| | | | |
|---|---|---|---|
| 1064547 | 10/1979 | Canada | 296/181 |
| 3027117 | 2/1982 | Fed. Rep. of Germany | 280/423 R |
| 2434052 | 4/1980 | France | 296/15 |

Primary Examiner—Charles A. Marmor
Assistant Examiner—Everett G. Diederiks, Jr.
Attorney, Agent, or Firm—Boniard I. Brown

[57] ABSTRACT

A trailer for hauling on the fifth wheel of a tractor-truck. The fifth wheel attachment point of the trailer is substantially above the flat floor thereof, the trailer's front wall and floor being at right angles to each other as are the trailer's top and rear, but the angle between the rear and the floor being obtuse so that the trailer is taller at its front than it is at the rear. Jacks are provided at the front of the trailer to level the floor for loading while allowing the forward portion to be tilted downwardly for attachment to the fifth wheel and hauling.

15 Claims, 2 Drawing Sheets

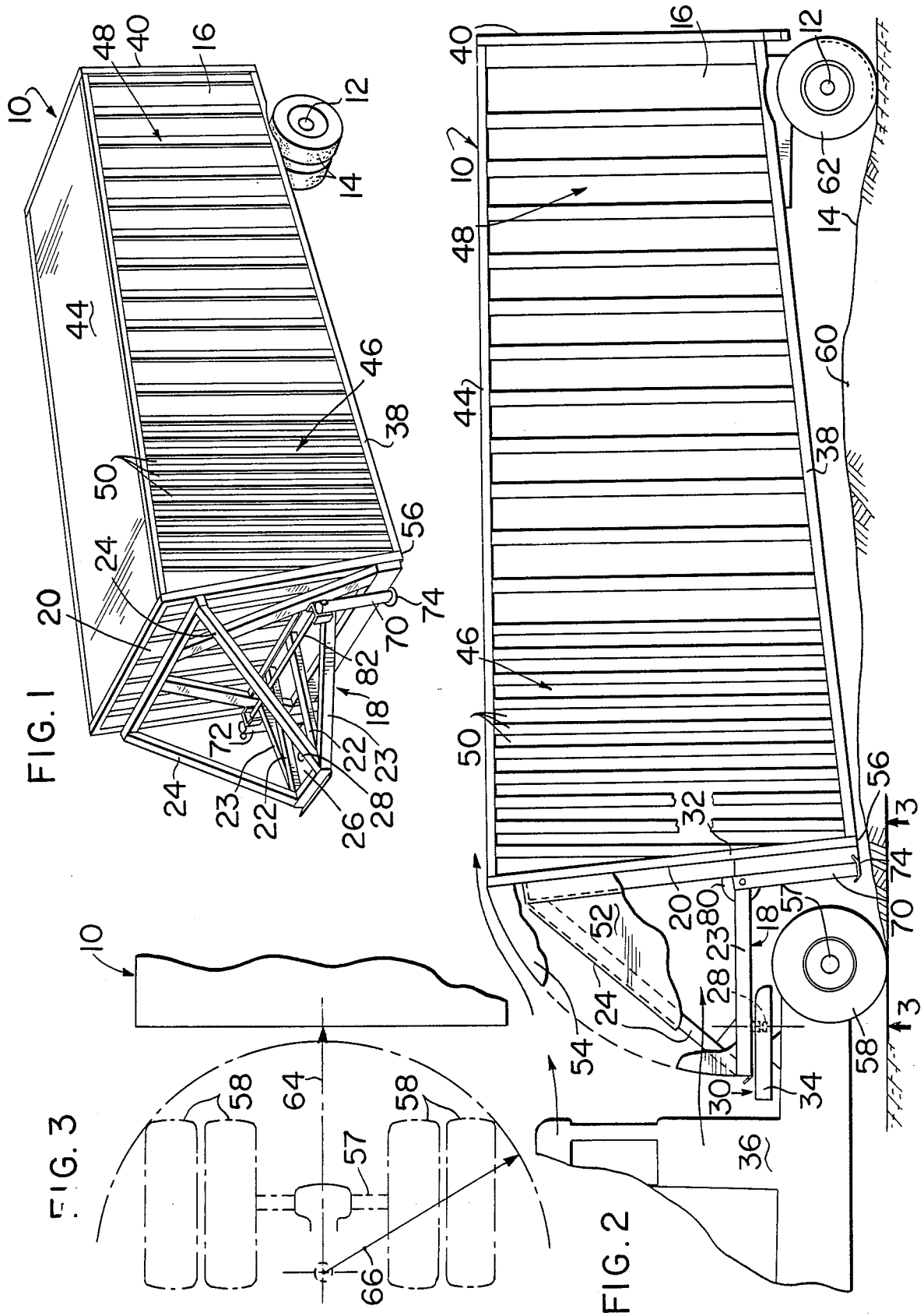

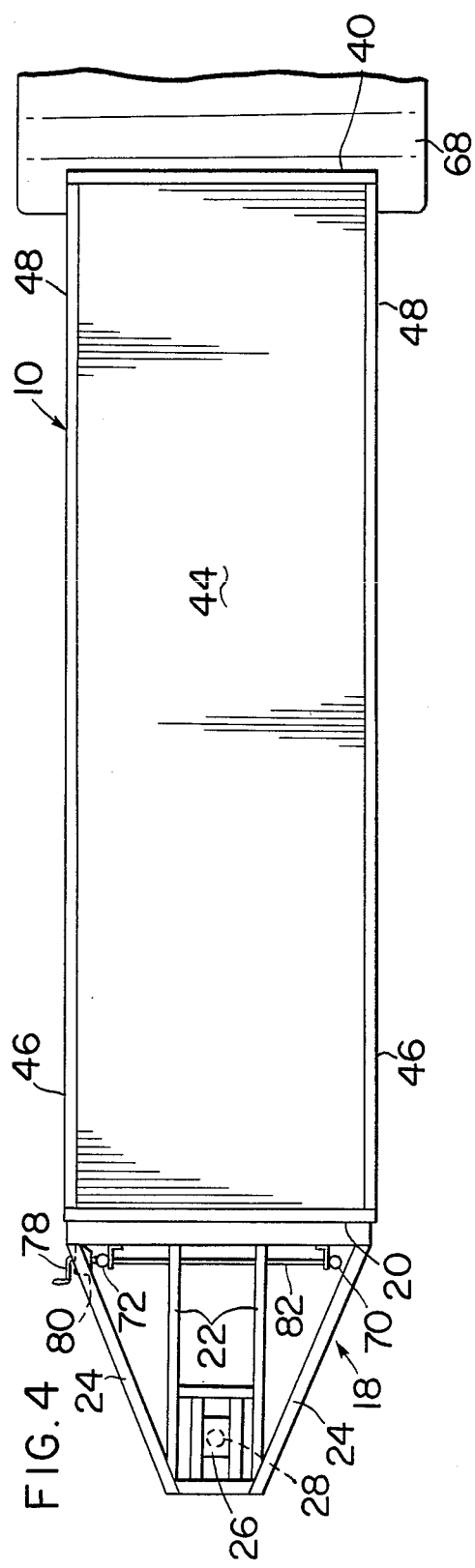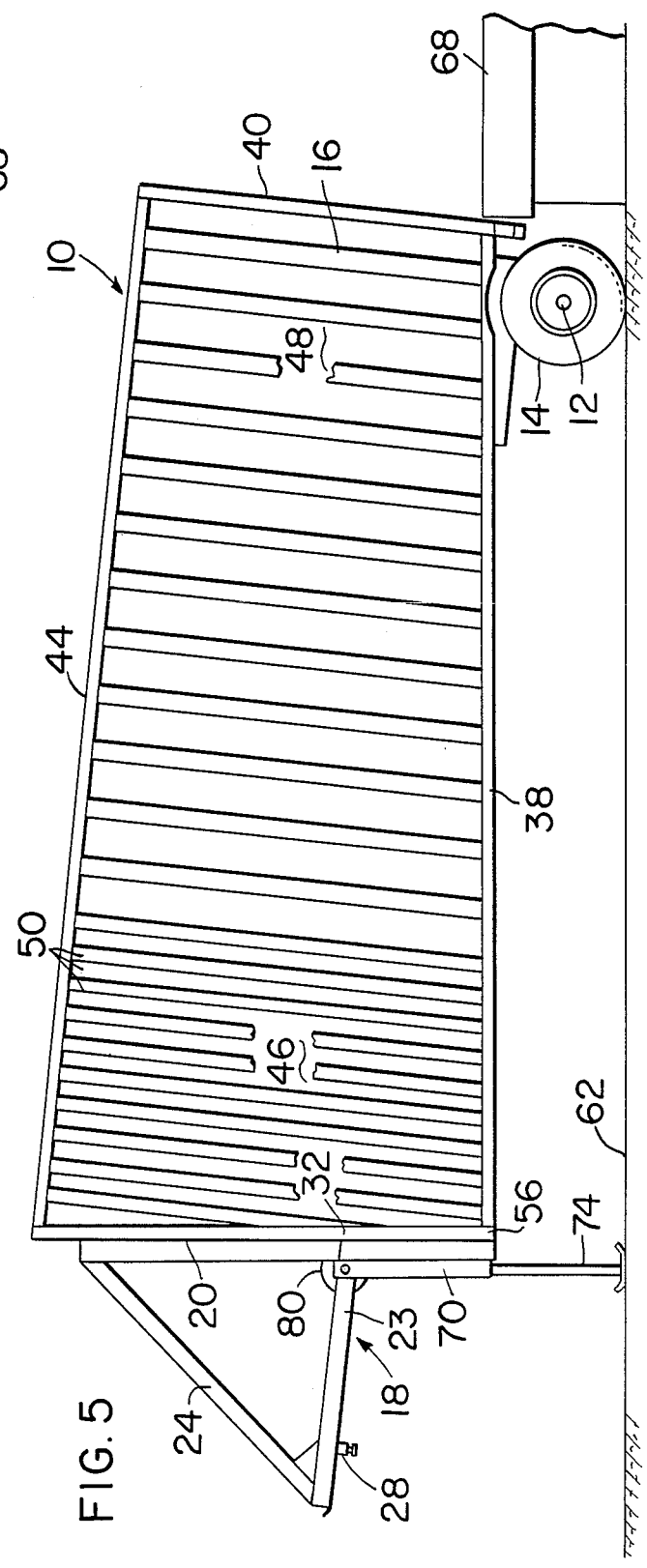

TRAILER this is a continuation of co-pending application Ser. No. 06/798,843 filed on Nov. 18, 1985 now abandoned.

BACKGROUND OF THE INVENTION

Fifth wheel tractor-trailer combinations are common sights along most highways. Except for special load purposes, such trailers usually are rectangular in side cross-section with rear doors that open to allow loading from an elevated dock onto the flat floor of the trailer. The floor of the trailer rests on the fifth wheel attachment means and the rear wheels of the trailer so that the floor of the trailer which are positioned to maintain the floor relatively level during both loading and hauling. The flat trailer floor must be above its rear wheels. Therefore such conventional trailers have a relatively high center of gravity and a high aerodynamic load since their floor must be maintained a substantial distance above the pavement.

In some instances it is highly desirable to forward load a trailer, that is, shift its longitudinal center of gravity forward since this tends to make the loaded trailer more stable when being hauled. However, when a load is volume rather than weight limiting, there are no opportunities within a standard trailer to assure a forward center of gravity. It is also desirable that the load within the trailer never bear heavily on the rear door since the load can be lost if the rear door opens. Therefore, a solution to the aforementioned problems has been sought which does not abandon the utility of flat floor, level loading from a loading dock.

Aerodynamic advantages, efficiency, reduced drag and energy conservation are provided by the provision of an aerodynamic shroud over a frontal truss structure according to the invention which supports the trailer on a fifth-wheel assembly.

SUMMARY OF THE INVENTION

The present trailer has its fifth wheel attachment point elevated on the front of the trailer so that its lower leading edge is below the level of the axle of the fifth wheel tractor to which it is attached. The trailer has a flat floor which when attached to a tractor, slopes downwardly toward the tractor. With the floor sloping downwardly, the trailer has a vertical rear and a horizontal top to accommodate height and length regulations. The front of the trailer slants with its upper portion toward the tractor so that a quadrilateral is formed having a right angle between the rear and front, a right angle between the top and rear, an obtuse angle between the rear and floor and an acute angle between the front and top. The result is a trailer with more load space toward the fifth wheel than toward the rear wheels so that its longitudinal center of gravity shifts forward with a uniform load while its vertical center of gravity is lowered. Jacks are provided adjacent the front of the trailer which allow its floor to be lifted to a level floor position when the trailer is docked for loading and unloading.

It is therefore an object of the present invention to provide a fifth wheel trailer with a flat floor which has a relatively low center of gravity when connected to a tractor.

Another object is to provide a fifth wheel trailer whose forward end volume is greater than its rear end volume.

Another object is to provide a trailer having aerodynamic improvements including a frontal aerodynamic shroud and the like for fuel and energy conservation and efficiency.

Another object is to provide an improved height to volume ratio, fifth wheel trailer.

These and other objects and advantages of the present invention will become apparent to those skilled in the art after considering the following detailed Specification together with the accompanying drawings wherein:

DETAILED DESCRIPTION OF THE DRAWINGS

FIG. 1 is perspective view of a trailer constructed according to the present invention;

FIG. 2 is a side elevational view of the trailer of FIG. 1 showing its normal orientation when connected to a fifth wheel tractor;

FIG. 3 is a diagrammatic view taken at line 3—3 in FIG. 2 of the clearance between the trailer and its connected tractor;

FIG. 4 is a top view of the trailer of FIGS. 1 and 2; and

FIG. 5 is a side elevational view similar to FIG. 2 with the trailer in its loading or unloading position, disconnected from a tractor.

DETAILED DESCRIPTION OF THE SHOWN EMBODIMENT

Referring to the drawings more particularly by reference numbers, number 10 in FIG. 1 refers to a trailer constructed according to the present invention. As shown, the trailer 10 includes a single rear axle 12 connecting wheels 14 thereto which support the rear portion 16 of the trailer 10. A truss structure 18 is connected to the front side 20 of the trailer 10 by suitable means such as welding.

The truss structure 18 includes an inner and outer pair of generally horizontal beams 22 and 23 supported to remain horizontal by canted beams 24. The male portion 26 including the tow pin 28 of a fifth wheel connection system 30 (FIG. 2) are connected to the beams 23. As shown in FIG. 2, the horizontal beams 22 and 23 extend forwardly from a midpoint 32 of the front side 20 of the trailer 10 so that when the male portion 26 of the fifth wheel connection system 30 is attached to its mating female portion 34 on a tractor truck 36 at a hitch point, the underframe and the floor 38 of the trailer 10 is angled downwardly from the rear 40 to the front 20 thereof. The front portion 42 of the trailer 10 is taller a like amount so that the roof 44 thereof is generally horizontal. This is desirable when a trailer 10 is under tow since the allowable height of the roof 44 usually is determined by legislation, and more practically, by the clearance height of over road obstructions. Therefore, the front portion sidewalls 46 are taller than the rear portion sidewalls 48, and as can be seen, have increased frequency of reinforcing ribs 50 to provide sufficient stiffness thereto.

The truss structure 20 may be enclosed by an aerodynamic cover 52, and preferably by a more aerodynamic shroud 54, shown in dashed outline and cutaway in FIG. 2.

Most of the underframe and floor 38 of the trailer 10 is positioned below the fifth wheel system 30, so a lower center of gravity of the trailer 10 results. This increases its stability which makes it safer to haul. Even though the lower leading edge 56 of the trailer 10 is below the axle 57 of the tractor truck 36, it is closely adjacent the rear wheels 58 of the tractor truck 36 so that it does not drag on elevated portions 60 of the roadway 62. The truss structure 18 is constructed with enough length 64 so clearance is provided between the front 20 and the wheels 58 as shown by the clearance radius 66 from the tow pin 28 to the front side 20 in FIG. 3.

When it is desired to load or unload the trailer 10 at a loading dock 68, the trailer 10 is backed up the to the loading dock 68 and jacks 70 and 72, connected to the front 20 of the trailer 10, are extended until their feet 74 engage the roadway 62. The jacks 70 and 72 then gradually elevate the front portion 42 of the trailer 10 until its underframe and floor 38 is level, as shown in FIGS. 4 and 5. The jacks 70 and 72 can be pneumatic, hydraulic or mechanical, with the mechanical type being shown where a handle 78 and a gear box 80 are used to extend and retract the jacks 70 and 72. A torque tube 82 is used to transfer the torque from the gear box 80 which sits adjacent the jack 72 to the jack 70.

When the trailer is in the position shown in FIG. 5, it can be loaded or unloaded by conventional means such as a fork lift. However, cargo can be stacked higher in the front portion 42 thereof so that the longitudinal center of gravity tends to shift forward. When placed back in connection with the tractor truck 36, the cargo within the trailer 10 is supported by the underframe 38, but since the load is tilted toward the front, it is also supported slightly by the front side 20. Therefore, the cargo sits tilted forwardly supported in the notch of a V so it does not tend to rock forward and back with the motion of the trailer 10.

Therefore there has been shown and described a novel fifth wheel trailer which fulfills all the objects and advantages sought therefore. Many changes, modifications, variations and other uses and applications of the subject invention will, however, become apparent to those skilled in the art after considering this Specification together with the accompanying drawings. All such changes, modifications, variations and other uses and applications which do not depart from the spirit and scope of the invention are deemed to be covered by the invention which is limited only by the claims that follow.

What is claimed is:

1. A roadway trailer for towing by a tractor truck and having a front, a rear and a body structure including side walls, the trailer comprising:
   an underframe supporting the body structure,
   a generally flat floor rigidly secured to the underframe,
   side walls of the body structure extending generally upwardly from the underframe, said side walls having upper edges and having their front portions substantially taller than their rear portions,
   at least one rear axle connected to the underframe and carrying wheels to support the trailer on the roadway, and
   hitch attachment means connected to the front of the trailer at a hitch point disposed substantially above the underframe, the underframe and floor inclining downwardly toward the trailer front and said side walls upper edges being generally horizontal when the hitch point is connected for towing of the trailer by the tractor truck.

2. A roadway trailer according to claim 1, wherein: the front portion of the underframe extends substantially below a rear axle of a truck tractor when the trailer hitch point is connected for towing by the truck tractor.

3. A roadway trailer for towing by a tractor truck and having a front, a rear and a body structure including side walls, the trailer comprising:
   an underframe supporting the body structure,
   a generally flat floor rigidly secured to the underframe,
   side walls of the body structure extending generally upwardly from the underframe,
   at least one rear axle connected to the underframe and carrying wheels to support the trailer on the roadway,
   the side walls intersecting the floor at a right angle to and being connected to the floor, the side walls extending to and being connected to said front wall,
   a rear wall intersecting said plane of said floor at an obtuse angle and being connected to said floor, said side walls extending to and being connected to the rear wall,
   a top wall connected at right angles to said side walls and said rear wall and at an acute angle to said front wall, and
   hitch attachment means connected to the front of the trailer at a hitch point disposed substantially above the underframe, the underframe and floor inclining downwardly toward the trailer front when the hitch point is connected for towing of the trailer by the tractor truck.

4. A fifth wheel roadway trailer for towing by a tractor truck and having a front, a rear and a body structure, the trailer comprising:
   an underframe supporting the body structure,
   a floor integral with the underframe,
   at least one rear axle connected to the underframe and carrying wheels to support the trailer on the roadway,
   fifth wheel attachment means connected with the underframe and including a male fifth wheel structure substantially above and inclined relative to the underframe and floor, and having a forwardly extending truss structure operatively connected to the underframe and having a hitch point,
   a front wall intersecting and connected to the floor at a right angle,
   first and second side walls, each intersecting the floor at a right angle and being connected to the floor, the first and second side walls extending to and being connected to said front wall,
   a rear wall intersecting the floor at an obtuse angle and being connected to said floor, said first and second side walls extending to and being connected to said rear wall, and
   a top wall connected at right angles to the first and second side walls and the rear wall, and at an acute angle to said front wall.

5. A roadway trailer according to claim 4, wherein: the front portion of the underframe extends substantially below a rear axle of a truck tractor when the trailer hitch point is connected for towing by the truck tractor.

6. A fifth wheel roadway trailer according to claim 4, and further including:
   an aerodynamic shroud mounted over the forwardly extending truss structure.

7. A fifth wheel roadway trailer according to claim 4, wherein:
the forwardly extending truss structure positions the underframe behind rear wheels of a towing tractor.

8. A fifth wheel roadway trailer according to claim 4, and further including:
jack means connected with said forwardly extending truss structure and arranged to support the front portion of the underframe in a generally horizontal position for loading and unloading of the trailer.

9. A fifth wheel roadway trailer according to claim 4, wherein:
said fifth wheel structure is substantially at right angles to the underframe.

10. A fifth wheel tractor-trailer combination, comprising:
a roadway trailer having a front, a rear, a body structure and ground wheels,
an underframe supporting the trailer body structure,
a floor integral with the underframe,
side walls extending upwardly from the floor and having front portions taller than their rear portions,
fifth wheel attachment means connected with the underframe and including a male fifth wheel structure substantially above and inclined relative to the underframe and floor, and means connecting the male fifth wheel structure to the underframe, and
a tractor having a female fifth wheel structure adapted for engagement with the male fifth wheel structure of the trailer at a hitch point positioned at a distance above the underframe predetermined to dispose the front portion of the underframe in a position wherein the underframe and floor are inclined downwardly toward the trailer front and the tractor rear axle is substantially above the front portion of the underframe and floor when the hitch point is connected for towing of the trailer by the tractor truck.

11. A roadway trailer according to claim 10, wherein:
a front portion of the underframe is substantially below a rearmost axle of the tractor when the male fifth wheel structure is engaged with the female fifth wheel structure for towing of the trailer.

12. A fifth wheel roadway trailer according to claim 10, wherein:
the male fifth wheel structure is disposed at an obtuse angle to the underframe.

13. A fifth wheel roadway trailer according to claim 10, and further including:
jack means connected with the male fifth wheel structure and arranged to support the front portion of the underframe in a generally horizontal position for loading and unloading of the trailer.

14. A roadway trailer for towing by a tractor truck and having a front, a rear and a body structure, the trailer comprising:
an underframe supporting the body structure and a floor integral with the underframe,
at least one rear axle connected to the underframe and carrying wheels to support the trailer on the roadway,
hitch attachment means connected to the front of the trailer and including a hitch point positioned at a distance above the underframe predetermined to dispose the front end portion of the underframe in a position wherein the underframe and floor incline downwardly toward the trailer front when the hitch point is connected for towing of the trailer by the tractor truck,
the body structure including first and second sides extending upwardly from the floor,
a top extending between the first and second sides, and
a rear wall extending upwardly from the floor,
said front, first and second sides, top and rear defining a body structure, wherein said first and second sides are parallel, said floor intersects the front at a right angle, said rear intersects the floor at an obtuse angle, and the rear intersects the top at a right angle.

15. A fifth wheel trailer having:
a floor defining a plane,
fifth wheel attachment means connected to said floor, said fifth wheel attachment means including:
a male fifth wheel structure located substantially above and non-parallel to said plane of said floor,
a front wall intersecting said plane of said floor at a right angle and being connected to said floor,
a forwardly extending truss structure connected to said front wall,
first and second side walls, each intersecting said plane of said floor at a right angle and being connected to said floor, said first and second side walls extending to and being connected to said front wall,
a rear wall intersecting said plane of said floor at an obtuse angle and being connected to said floor, said first and second side walls extending to and being connected to said rear wall,
a top wall connected at right angles to said first and second side walls and said rear wall, and at an acute angle to said front wall,
at least one rear axle, and
tires mounted on said at least one axle to support said trailer, said floor being connected to said at least one axle in position above said tires, said male fifth wheel attachment means having:
a hitch point located substantially above said defined plane of said floor whereby said defined plane of said floor slopes downwardly toward said front wall and extends substantially below the rearmost axle of a tractor truck when attached thereto by said fifth wheel attachment means with said front adjacent to and behind the rearmost axle of the tractor truck.

* * * * *